United States Patent [19]

Sweeney

[11] Patent Number: 5,667,760
[45] Date of Patent: Sep. 16, 1997

[54] METHODS FOR SWEETENING HYDROCARBONS

[76] Inventor: Charles T. Sweeney, 708 Mockingbird La., Kerrville, Tex. 78028

[21] Appl. No.: 515,391

[22] Filed: Aug. 15, 1995

[51] Int. Cl.$^6$ ............................................. B01D 53/52
[52] U.S. Cl. .......................... 423/224; 95/205; 205/465; 205/466; 205/500
[58] Field of Search .............. 95/205; 423/220, 423/224, 225; 205/465, 466, 500; 252/186.21, 186.27, 186.36, 187.26

[56] References Cited

U.S. PATENT DOCUMENTS

| | | | |
|---|---|---|---|
| 4,307,067 | 12/1981 | Tagawa | 423/224 |
| 4,443,423 | 4/1984 | Olson | 423/576.6 |
| 4,462,968 | 7/1984 | Tazuma | 423/224 |
| 4,499,059 | 2/1985 | Jones | 423/226 |
| 4,729,835 | 3/1988 | McNeillie | 210/759 |
| 4,844,874 | 7/1989 | DeVries | 423/210 |

FOREIGN PATENT DOCUMENTS

| | | | |
|---|---|---|---|
| 1186490 | 5/1985 | Canada | 23/345 |

*Primary Examiner*—John Niebling
*Assistant Examiner*—Brendan Mee
*Attorney, Agent, or Firm*—Neal J. Mosely

[57] ABSTRACT

Sour natural gas, containing $H_2S$ and organic sulfide contaminants, is contacted with a sweetening composition comprising an aqueous solution of a substantially equimolar mixture of OCl and $HO_2$, (preferably NaOCl and NaOOH) for a time sufficient to oxidize the sulfides to an odorless form. The solution has a pH of 9.0–10.5, an oxidation normality of 0.001–0.1. The solution may be produced by mixing $Cl_2$ into a dilute aqueous solution of NaOH at about pH 10.5 until the pH reaches a level of about 9.5–10.5, or produced electrochemically in a diaphragm cell having a bipolar electrode in the same compartment as the anode, collecting the effluent gas from the cell and absorbing said effluent gas into a dilute aqueous solution of NaOH at about pH 9.5–10.5. The treatment may be run as an adjunct to a metal chelate redox treatment to improve the oxidation by the redox catalyst and to improve the catalyst regeneration. The treatment may be run in batch, in a scrubbing tower, or in-line in a flowing gas stream with solids removal provided.

27 Claims, No Drawings

METHODS FOR SWEETENING HYDROCARBONS

BACKGROUND OF THE INVENTION

1. Field of Invention

This invention relates to improvements in the sweetening of sour, gaseous hydrocarbons, liquid hydrocarbon condensates, or crude petroleum products in a treating tower, or in a pipeline, or at the well-head or collection point in an oil or gas field, and more particularly to an improved method for sweetening by oxidation.

2. Brief Description of Prior Art

The production of gaseous or liquid hydrocarbons often requires the separation or removal of various contaminants from these streams before they can be transported for further use. These petroleum components usually contain substantial quantities of entrained water and other gaseous and liquid hydrocarbon condensates containing toxic constituents, which subsequently must be removed.

Gaseous hydrocarbons contain other gaseous impurities, which are acids in aqueous solutions, and are thus corrosive in nature. Hydrogen sulfide and other organic sulfides, which are very toxic and malodorous are otherwise termed as toxic, sour systems. Hydrogen sulfide ($H_2S$) is more toxic than hydrogen cyanide (HCN) and presents a further problem that it is highly malodorous in very low concentrations and tends to anesthetize the olfactory nerves with the result that a toxic exposure may not be recognized until it is too late. The removal or neutralization of $H_2S$ is therefore a matter of necessity!

One process for removal of $H_2S$ and other organic sulfides entails a solid/gas chemical reaction. An iron-sponge, consisting of a hydrated iron oxide on an inert support, is treated with the sour gaseous system converting the iron oxide to the sulfide, i.e., iron pyrites. Exposure of wet iron sulfide to air, as it is removed from the bubble-tower, may cause a pyrophoric condition to exist resulting in a fire.

Some physical processes for removal of $H_2S$ and organic sulfides require solid clays such as molecular sieves, i.e., zeolites and other materials having pore sizes in molecular dimensions which are specific for removal of $H_2S$ and $CO_2$. These types are used in the form of a bed through which the sour gaseous or liquid mixture is passed. The bed is periodically regenerated by stripping with an inert gas. This process has the disadvantage present in most desulfurization processes in that the separated $H_2S$ or organic sulfides must be disposed of in the field by flaring or other mechanical means.

Other processes for removal of $H_2S$ and organic sulfides involves the use of strong oxidizers at high concentrations. These processes have been expensive in using large amounts of expensive oxidizers.

Systems have been developed wherein chemical scavengers are injected by in-line techniques without the obvious disadvantages described above. A brief history of these types of scavenging agents will be presented below.

Materials used with such in-line injection techniques include various aldehydes. $H_2S$ reacts rapidly and completely with aidehydes to form a variety of addition compounds, such as polyethylene sulfide, polymethylene disulfide and trithiane. Such a process was disclosed in the following publication: Walker, J. F., "FORMALDEHYDE", Rheinhold Publishing Co., New York, page 66.(1953).

Alkanolamines are widely used in systems that adsorb $H_2S$ as disclosed above. These in-line injection systems are in use throughout the oil and gas industry. U.S. Pat. No. 2,776,870 discloses a process for separating acidic components from a hydro-carbon mixture comprising adding to the mixture of hydrocarbons an absorbent containing water-soluble aliphatic amines and Alkanolamines, preferably monoethanolamine. However, Alkanol-amines are not selective in their reaction with $H_2S$ and $CO_2$ in that, they react with all acidic components present in these hydrocarbon mixtures removing both $H_2S$ as well as $CO_2$. Such non-selectivity is not desirable in many applications and therefore the usage of alkanolamines has come under disfavor for this reason.

Baize U.S. Pat. No. 4,748,011, Dillon U.S. Pat. No. 4,978,512, Vasil U.S. 5,314,672 and Weers European patent 411,745 are representative of processes using amine-formaldehyde reaction products for sweetening sour natural gas by in-line or well-head injection.

Lonnes U.S. Pat. No. 3,969,479 discloses a method for oxidizing odorous constituents of contaminated gas in rendering plants, fish processing plants, asphalt plants, and other plants in which aldehydes, fatty acids, ketones, mercaptans, amines, hydrogen sulfide, sulphur dioxide, nitric oxide, phenols or other pollutants are emitted. Chlorine in the form of sodium hypochlorite in a concentration of 5–50 ppm is the preferred oxidizing agent. Consumption of the oxidizing agent is minimized by continuously purging 1–5% of the scrubbing liquid to thereby promptly remove precipitates and other solids.

Banasiak U.S. Pat. No. 4,049,775 discloses a method for purifying waste air from sulfuric gases, in particular from hydrogen sulfide, carbon disulfide and sulfur dioxide by adsorption and oxidation in a bath containing inorganic oxidizing compounds soluble in water, e.g. hypochlorites of alkali metals, preferably sodium hypochlorite and a catalyst at pH of 9–12 in a dosed cycle of bath.

Brown U.S. Pat. No. 4,361,487 discloses removing hydrogen sulfide from geothermal steam condensate by oxidizing with a peroxygen compound such as hydrogen peroxide in the presence of catalytic quantities of sodium vanadate under neutral to alkaline conditions.

Oakes U.S. Pat. No. 4,473,115 discloses a method for reducing concentrations of hydrogen sulfide present in subterranean well fluids by injection of a stabilized solution of chlorine dioxide.

Meisel U.S. Pat. No. 4,548,708 discloses a process for substantially complete elimination of hydrogen sulfide from the organic phase of natural gas, crude oil or mixtures thereof, by reaction with aqueous hydrogen peroxide in the absence of any catalyst.

Chelu U.S. Pat. No. 4,550,010 discloses a process for deodorizing polluted air, wherein the air to be deodorized is washed in a washing apparatus with an aqueous solution of hydrogen peroxide.

Brunasso U.S. Pat. No. 5,047,218 gas containing sulfur compounds being admixed with an ozone-containing gas, then contacted with a scrubbing composition to obtain a gas and a product solution. The gas exhibits a significant reduction in sulfur compounds as compared to the feed gas.

These oxidative processes are all objectionable is using excessive amounts of expensive oxidants.

SUMMARY OF THE INVENTION

One of the objects of this invention is to provide a new and improved method for sweetening sour natural gas at the well head, during collection, during transmission, or in a treating tower.

Another object of this invention is to provide a new and improved method for sweetening sour natural gas by atomizing a new and improved sweetening solution into a flowing stream of natural gas or into a treating tower.

Another object of this invention is to provide a new and improved method for sweetening sour natural gas by mixing a new and improved sweetening solution into a flowing stream of natural gas or into a treating tower wherein the composition is an oxidizer.

Another object of this invention is to provide a new and improved method and composition for sweetening sour natural gas by mixing a new and improved sweetening solution into a flowing stream of natural gas or into a treating tower wherein the sweetening solution is a very dilute mixed oxidant solution containing various chlorine and oxygen species.

Another object of this invention is to provide a new and improved method for sweetening sour natural gas by mixing a new and improved sweetening solution into a flowing stream of natural gas or into a treating tower wherein the sweetening solution is a very dilute, electrolytically-produced, mixed oxidant solution containing various chlorine and oxygen species having a concentration of 0.01–7.0% at a pH of 7.5–12.0.

Another object of this invention is to provide a new and improved method for sweetening sour natural gas by mixing a new and improved sweetening solution into a flowing stream of natural gas or into a treating tower wherein the sweetening solution is a very dilute, electrolytically-produced, mixed oxidant solution containing various chlorine and oxygen species comprising a mixture of chlorine, chlorine oxides, and various oxygen species, such as oxygen, hydrogen peroxide, ozone, etc. having a concentration of 0.01–7.0% as a pH of 7.5–12.0.

Another object of this invention is to provide a new and improved method and composition for sweetening sour natural gas by mixing a new and improved sweetening solution into a flowing stream of natural gas or into a treating tower wherein the sweetening solution is a very dilute, electrolytically-produced, mixed oxidant solution containing various chlorine and oxygen species in which the major active ingredients are sodium salts of $ClO_x$ where $x=1$ predominates but other values of x up to six and seven are possible.

Another object of this invention is to provide a new and improved method for sweetening sour natural gas by mixing a new and improved sweetening solution into a flowing stream of natural gas or into a treating tower wherein the sweetening solution is a mixture of a hydroperoxide ($OOH^-$), and a stable hypochlorite ($OCl^-$) solution having a pH of 9.0–9.5 and normality from 0.001–0.1.

Another object of this invention is to provide a new and improved method for sweetening sour natural gas by mixing a new and improved sweetening solution into a flowing stream of natural gas or into a treating tower wherein the sweetening solution is mixture of a hydroperoxide ($OOH^-$), and a stable hypochlorite ($OCl^-$) solution having a pH of 6.8–7.2 and normality from 0.001–0.1, buffered for immediate use with a mixture of sodium dihydrogen phosphate monohydrate ($NaH_2PO_4.H_2O$) and sodium hydrogen phosphate ($Na_2HPO_4$).

Other objects of this invention will become apparent from time to time throughout the specification and claims as hereinafter related.

DESCRIPTION OF THE PREFERRED EMBODIMENTS

This invention comprises new and useful improvements in sweetening methods for sweetening sour natural gas and more particularly on the discovery that certain very dilute mixed oxidant solutions containing various chlorine and oxygen species are effective to oxidize $H_2S$ and organic sulfides present in sour natural gas to a non-toxic, substantially odorless form. The mixed oxidant solutions are obtained according to procedures invented by applicant and used in the treatment of cellulosic waste products to render the same edible. The discovery was unexpected and completely unrelated to applicant's other investigations is the preparation and use of mixed oxidants. In the Examples A–C, procedures are described for the production of mixed oxidants for use in the process of this invention.

EXAMPLE A

Production of Mixed Oxidants by the Procedure of Sweeney U.S. Pat. Nos. 5,032,239 and 5,118,397

Sweeney U.S. Pat. No. 4,256,552 discloses an electrolytic generator for production of chlorine, for chlorination of swimming pools, water systems, etc., in which a bipolar electrode is positioned in the anode compartment between the anode and the cation-exchange membrane in the wall separating the compartments. Sweeney U.S. Pat. No. 4,334,968 discloses improvements on the cell or generator of U.S. Pat. No. 4,256,552 and discloses the production of some chlorine dioxide in the cell. Sweeney U.S. Pat. No. 4,248,681 discloses a method of producing chlorine/chlorine dioxide mixtures in the cells of U.S. Pat. Nos. 4,256,552 and 4,334,968 and gives some optimum operating conditions. Sweeney U.S. Pat. No. 4,308,117 discloses a cell having three compartments, with the anode and cathode in the outer compartments and the bipolar deerrode in the central compartment. A cation-exchange membrane is positioned in the wall between the central compartment and the cathode compartment, while an anion-exchange membrane is positioned in the wall between the central compartment and the anode compartment. Sweeney U.S. Pat. No. 4,324,635 discloses a cell having an anode compartment, a cathode compartment, and a separating wall with a cathode-exchange membrane therein. The cell includes a pump circulating some of the cathode compartment solution to the anode compartment for pH control. The gases produced by these cells has come to be referred to as mixed oxidant gases which contain chlorine, chlorine oxides, oxygen and other oxygen species.

In subsequent studies, it has been found that cells of the type shown in patents U.S. Pat. Nos. 4,256,552, 4,334,968 and 4,248,681 can be operated with very low salt concentrations and produce oxidizing gases containing very small amounts of chlorine or chlorine compounds. Sweeney U.S. Pat. No. 4,804,449 discloses the use of nonionic membranes of Kanecaron in place of Nafion in electrolytic cells for production of mixed oxidant gases. Kanecaron fibers are of a modacrylic composition of acrylic polymeric structure having 35–85% wt. acrylonitrile units. Kanecaron fibers used in these cells are modacrylic fibers of this general type composed of 50% acrylonitrile and 50% vinyl chloride fibers.

In Sweeney U.S. Pat. Nos. 5,032,239 and 5,118,397, mixed oxidants are produced by the electrolytic cells described in the various Sweeney U.S. patents discussed above. A mixed oxidant generator (electrolytic cell) produces an oxidant gas mixture which is introduced into an absorber where it is dissolved in water with appropriate adjustment of pH to an alkaline condition to produce a mixed oxidant solution of 0.01–7.0% at a pH of 7.5–12.0. The mixed-oxidant gas is a mixture of chlorine, chlorine oxides, and various oxygen species, such as oxygen, hydrogen peroxide, ozone, etc. These solutions can be used in the natural gas sweetening process described in more detail below.

EXAMPLE B

Production of Mixed Oxidants by the Procedure of Sweeney U.S. Pat. Nos. 5,352,340 and 5,411,655

In Sweeney U.S. Pat. No. 5,352,340, mixed oxidants are produced by the electrolytic cells described in the various Sweeney U.S. patents discussed above having a Kanecaron membrane and titanium electrodes (U.S. Pat. No. 5,411,655). A mixed oxidant generator (electrolytic cell) produces an oxidant gas mixture (predominantly chlorooxy acids) which is introduced into an absorber where it is dissolved in water with appropriate adjustment of pH to an alkaline condition to produce a mixed oxidant solution of 0.01–7.0% at a pH of 7.5–12.0. The mixed-oxidant gas is a mixture of chlorine, chlorine oxides, and various oxygen species, such as oxygen, hydrogen peroxide, ozone, etc. These solutions can be used in the natural gas sweetening process described in more detail below.

While neutralization and stabilization greatly reduce the oxidizing potential of many of the oxidizing species generated in the anode chamber, it enhances the activity of others. A number of experiments were undertaken to identify the active species. The experimental evidence suggests that the major active ingredients are sodium salts of $ClO_x$. While $x=1$ predominates, others values of x up to six and seven are possible. Other active ingredients appears to be salts of the Oxion. These latter compounds are not nearly as stable in caustic solutions as are the $ClO_x$ salts, and they certainly are more difficult to monitor on an analytical basis. In both cases, however, the salt complexes can be destabilized by acid conditions (pH reduction) and ultraviolet light. The preponderance of the experimental evidence suggests that for the liquid reagent produced the active ingredients are sodium salts of $ClO_x$.

In carrying out these analyses, the solutions have been characterized by normality of the oxidizer species rather than concentration in parts per million (ppm). An oxidant is a chemical species that accepts electrons from another chemical species, the reductant. Oxidant strength is a measure of affinity to accept electrons and does not depend on concentration. Concentration measures the number of oxidant molecular or ions per liter of solution, regardless of oxidant strength. For example, the oxidizing strength of ozone Is higher than that of chlorine, even if the chlorine concentration in a solution is larger than the ozone concentration.

Chemists commonly use the normality concentration scale for oxidants and reductants. For an oxidant, normality is defined as the number of oxidizing equivalents present in exactly one liter of solution. One equivalent equals the amount of oxidant that accepts precisely one mole ($6.022 \times 10^{23}$) of electrons. The symbol representing the normality concentration scale is N.

It is not necessary to know the composition of a mixed oxidant to calculate its normality. The normality scale may be used to express the total oxidizing capacity per liter of a mixed oxidant solution, regardless of how many oxidants are present or what their separate concentrations are. Normality, as calculated below, is subsequently referred to as "oxidation normality" or "oxidant normality".

For oxidants, parts per million is defined as follows: ppm=(mass of oxidant×1,000,000)/(mass of solution) If the ppm scale is to be used exactly, the chemical formula of the oxidant, the mass of the oxidant and the mass of the solution must all be known. In practice, it is not convenient to directly measure the masses of oxidant and solution. Furthermore, the ppm scale is confusing if the chemical formula of the oxidant is not known or if a mixture of oxidants is present.

The use of normality has the advantage that it may be determined by titration without weighing anything, and directly measures the most important property of a commercial oxidant solution, its capacity to accept electrons per unit volume. When scales such as ppm of $Cl_2$ or ppm of $O_3$ are used, confusion may arise when the actual oxidants in solution are not $Cl_2$ or $O_3$ respectively.

Normality is determined by titration using the formula: $N_{standard} XV_{standard} = N_{sample} XV_{sample}$ is used. An exact volume ($V_{sample}$) of sample oxidant solution (i.e., 10 ml) is measured by piper and transferred into a flask. The sample is then titrated by a standardized reductant (i.e. sodium thiosulfate for iodine fitrations) whose normality ($N_{standard}$) is known exactly. When the oxidant is used up at the titration endpoint, the volume of standardized reductant consumed ($V_{standard}$) is recorded from the buret reading. The normality of the sample ($N_{sample}$) is easily calculated after $N_{standard}$, $V_{standard}$ and $V_{sample}$ are all determined: $N_{sample}=(N_{standard} X V_{standard})/V_{sample}$. Standardized reductant solutions may be purchased or made up in the laboratory according to well-established procedures.

The reactions of chlorine and ozone with electrons may be represented:

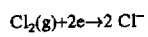

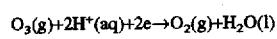

Since both $Cl_2$ and $O_3$ accept 2 electrons, equivalent weights equal one-half of the molecular weights. For $Cl_2$, the mass that accepts one mole of electrons equals 70.906 g per mole/2 equivalents per mole =35.453 g per equivalent. Similarly, the equivalent weight of $O^3$ is 48.00/2=24.00 g per equivalent. Approximate conversions between ppm and normality scales are: ppm $Cl_2$=Normality×35,453; ppm $O_3$=Normality×24,000.

These approximate conversions assume that the mass of 1 liter of solution equals 1 kg=1,000 g (reasonable for dilute aqueous solutions). Oxidant concentrations on the ppm of $Cl_2$ or ppm of $O_3$ scales can be converted to normality using the same formulae, i.e., Normality=ppm $Cl_2$/35,453 and Normality=ppm. $O_3$/24,000.

The cell was operated at 6 v. 250 amp with a NaCl solution and a mixed oxidant gas was evolved. The mixed oxidant gas was absorbed in an alkaline aqueous solution prepared by mixing 280 ml of 50% aqueous NaOH with 60 gal of water. Water samples were taken and analyzed by acidified KI crystals and sodium thiosulfate reductant. The formula $N_{std}XV_{std}=N_{sample}XV_{sample}$ is then applied to determine normality of the sample. Titrations were made at different pH levels before acidification to give Cl content and after acidification to give $O_3$. The results of fitrations at selected pH levels are set forth in Table I below.

TABLE I

| pH level | 9.6 | 7.5 | 6.9 |
|---|---|---|---|
| Normality of Cl | .0056 | .0072 | .0102 |
| Normality of $O_3$ | .0074 | .0080 | .0088 |
| ppm total oxidant | 376 | 447 | 561 |

In another run the cell was operated at 8.5 v. 400 amp with a NaCl solution and a mixed oxidant gas was evolved. The mixed oxidant gas was absorbed in an alkaline aqueous solution prepared by mixing 280 ml of 50% aqueous NaOH with 60 gal of water.

Water samples were taken and analyzed by acidified KI crystals and sodium thiosulfate reductant. The formula $N_{std}XV_{std}=N_{sample}XV_{sample}$ is then applied to determine normality of the sample. Titrations were made at different pH levels before acidification to give Cl content and after addification to give $O_3$. The results or titrations at selected pH levels are set forth in Table II below.

TABLE II

| pH level | 9.7 | 8.5 | 7.1 |
|---|---|---|---|
| Normality of Cl | .0060 | .0070 | .0094 |
| Normality of $O_3$ | .0050 | .0100 | .0110 |
| ppm total oxidant | 333 | 488 | 597 |

In another run the cell was operated at 6 v. 400 amp with a NaCl solution and a mixed oxidant gas was evolved. The mixed oxidant gas was absorbed in an alkaline aqueous solution prepared by mixing 280 ml of 50% aqueous NaOH with 60 gal of water.

Water samples were taken and analyzed by acidified KI crystals and sodium thiosulfate reductant. The formula $N_{std}XV_{std}=N_{sample}XV_{sample}$ is then applied to determine normality of the sample. Titrations were made at different pH levels before acidification to give Cl content and after acidification to give $O_3$. The results of titrations at selected pH levels are set forth in Table III below.

TABLE III

| pH level | 10.6 | 9.1 | 7.3 |
|---|---|---|---|
| Normality of Cl | .0050 | .0062 | .0094 |
| Normality of $O_3$ | .0020 | .0058 | .0070 |
| ppm total | 225 | 359 | 501 |

Conclusions From Titrations

The analyses utilizing 2 end point titrations (one prior to acidification of sample and another after acidification) may prove valuable when correlated with extreme pH variations which may affect either component. To apply the solution at a pH of 7.5–83 is an advantage as a non-acidic and non-caustic solution. Users are always concerned over equipment corrosion. High pH ranges favor $Cl_2$ groups, lower pH ranges favor peroxido "O" groups). NaOH is needed if only to buffer the water tank to allow mixed oxidant to build up to the desired (and required) normality level. Attempting to utilize distilled water for test purposes was not useful for the above reason.

EXAMPLE C

Production of Mixed Oxidants by the Procedure of Sweeney U.S. Pat. No. 5,292,410

A mixed oxidant generator, as in the above-identified Sweeney patents, produces an oxidant gas mixture which is introduced into an absorber where it is dissolved in water with appropriate adjustment of pH to an alkaline condition to produce a mixed oxidant solution of 0.01–7.0% at a pH of 7.5–12.0 consisting of a mixture of salts of the formula $NaClO_x$, where x is 1–7. The mixed-oxidant gas is a mixture of chlorine, oxides of chlorine, and various oxygen species, such as oxygen, hydrogen peroxide, ozone, etc. When a low salt concentration solution is electrolyzed in the cell, the output is a mixed oxidant gas containing chlorine and various oxygen-containing species.

A mixed oxidant generator, as in the above-identified Sweeney patents and as described in Examples A and B, produces an oxidant gas mixture which is introduced into an absorber where it is dissolved in water with appropriate adjustment of pH to an alkaline condition to produce a mixed oxidant solution of 0.0.1–7.0% at a pH of 7.5–12.0 consisting of a mixture of salts of the formula $NaClO_x$, where x is 1–7. The mixed-oxidant gas is a mixture of chlorine, oxides of chlorine, and various oxygen species, such as oxygen, hydrogen peroxide, ozone, etc. When a low salt concentration solution is electrolyzed in the cell, the output is a mixed oxidant gas containing chlorine and various oxygen-containing species.

The mixed oxidant gas generator was operated to produce a mixed-oxidant gas comprising a mixture of chlorine, chlorine oxides, and various oxygen species, such as oxygen, hydrogen peroxide, ozone, etc., which was absorbed into aqueous alkali at pH 12.0 to produce a solution containing 0.070% mixed oxidants (700 ppm.) in the form of NaClOx salts, where x=1–7. 200 ml. mixed oxidant solution were mixed with 120 ml. of 50% aqueous NaOH to produce a solution of pH 7.7 having a mixed oxidant normality of 0.0365.

Previous data, presented above suggests that two distinct components exist in the mixed oxidant solution. However, it was found that after adding KI crystals and titrating with sodium thiosulfate (during an analytical procedure) the first component of the mixed oxidant ended up to be a pH of 10 to 11. This was an indication that a peroxide was the first component. Upon monitoring pH of the second component (after having acidified solution), a reaction response with the KI was at the approximate pH of HOCl acid.

An attempt was then made to determine whether the solution contained any extremely reactive chlorite or perchlorate, etc., so 500 ml of the solution was allowed to totally evaporate leaving a crystal sediment which was analyzed. Test results show the major component is HOCl or OCl. The ability to distinguish between the two is not easy but concurred with the hypotheses being examined.

One expert has indicated a formula whereby small amounts of peroxide could be existent in the presence of chlorites above a pH of 8.5. However, the HOCl component begins to show up in the electrolytic process based on the pH of the solution. The solution, after being prepared, diminishes over time from pH of 8.3 down to pH 7.4 to 7.5 and then stabilizes. That is the stable point of HOCl in solution and substantially no peroxide could then be present. Several oxidant products may be form-ed in the electrolysis of aqueous solutions containing NaCl and NaOH. Relevant reactbus and thermodynamic data are summarized helow.

The oxidation of hydroxide ion (OH) to hydroperoxide ($HO_2$) in basic solution occurs at a much samller potential than is required for the oxidation of water to hydrogen peroxide in neutral or acidic solution. Hydrogen peroxide is a weak acid that ionizes to give the hydroperoxide ion in strongly basic solutions. The $pK_a$ of 11.6 meaus that the major form of peroxide in solutions with pH less than 11 is $H_2O_2$. Above pH 12, most of the peroxide is found in the $HO_2$ ionic form. 2 $HO_2$ (aq.)→2 OH(aq.)+$O_2$ (g) 2 $H_2O_2$ (aq.)→2 $H_2O$(I)+$O_2$ (g). Both $HO_2$ and $H_2O_2$ are unstable in aqueous solution, eventually decomposing with evolution of oxygen gas. Fortunately, these reactions are slow without a catalyst: so aqueous peroxide solutions are stable at room temperature. Decomposition of peroxide to oxygen in boiling water is quite fast, however.

Electrolysis of water not only converts OH— or $H_2O$ to peroxide, but complete oxidation to oxygen also occurs. The oxidation potentials show that it is easier to convert water to oxygen than to peroxide. For this reason, $O_2$ inevitably is a byproduct of electrolysis of water, even if peroxide is the desired product. Some ozone may also be generated at the anode, but both $O_2$ and $O_3$ will be carried away in the gas stream.

A higher potential is required to oxidize chloride ion to chlorine than is needed to convert hydroxide ion to hydroperoxide in basic solutions. In neutral or acidic solutions, however, the reverse is true. The oxidation of Cl to $Cl_2$ stays at the same potential for all pH's, but the water-peroxide oxidation shifts to higher potential with the decreasing pH. For this reason, the yield of peroxide from the electrolysis of water at pH's less than 10 will be very small. $Cl_2(g)+H_2O(l) \leftrightharpoons HClO(aq)+HCl(aq)$  $Cl_2(g)+2OH^-(aq) \rightarrow ClO^-(aq)+Cl^-(aq)+H_2O(l)$.

Chlorine reacts with water in both acidic and basic solutions. In acidic solution, small amounts of hypochlorous acid (HClO) and hydrochloric acid (HCl) are in equilibrium with unreacted chlorine. Virtually all of the chlorine is consumed in basic solutions, however, generating a mixture of hypochlorite and chloride ions. For this reason, chlorine gas bubbles out of solution when a hypochlorite/chloride mixture is acidified.

Hypochlorite ion is a relatively strong oxidant in basic solution, ranking nearly equal to the hydroperoxide ion in oxidizing strength. Hypochlorous acid, a much stronger oxidant than hypochlorite ion, is converted to ClO with a $pK_a$ of 7.5. This means that HClO will be the dominant form of hypochlorite below pH 7 while ClO is favored at pH larger than 8.3. $ClO \rightarrow ClO_3^-(aq)+2 Cl^-(aq)$ The hypochlorite ion reacts with itsdf to give chlorate ($ClO_3^-$) and chloride products. This reaction is unavoidable—there will always be some chlorate in hypochlorite solutions. This side reaction occurs most quickly in neutral solutions. Although $ClO_3$ is a stronger oxidant than $ClO^-$, chlorate generally reacts very slowly with reducing agents in neutral or basic solution, making it effectively useless as an oxidizing agent.

At about a pH of 9, hypochlorite is extremely stable and exists in solution as sodium hypochlorite ($NaClO_x$). In some applications, a hydrogen (H) is taken from the material treated and breaks the sodium hypochlorite into hypochlorous acid (HOCl) and sodium hydroxide (NaOH) or sodium chloride (NaCl). Both sodium components would be of minor benefit, and sodium hydroxide (NaOH) component plus hypochlorous acid is similar in reference to previous research, in other fields, utilizing sodium hydroxide (NaOH) and hydrogen peroxide ($H_2O_2$). When chlorine is mixed into a high pH solution of sodium hydroxide (NaOH) the following occurs: $Cl_2(g)+2\ NaOH\ (aq) \leftrightharpoons NaOCl\ (aq)+NaCl\ (aq)+H_2O(l)$. In an aqueous solution between pH 9.0 and 10.5, the introduction of chlorine results in the formation of approximately equal amounts of hypochlorite ($OCl^-$) ions and hydroperoxide ($OOH^-$) ions, as sodium salts, which is an exceptional oxidizing agent.

The efficiency of chlorine absorption into acidic aqueous solution is much lower. $Cl_2\ (g)+H_2O(l) \leftrightharpoons HOCl(aq)+HCl\ (aq)$. In fact, when the pH of hypochlorite solutions is allowed to drop below 7 for an appreciable period of time, oxidizing power is lost by the escaping chlorine gas. Loss of chlorine occurs in several steps. First, hypochlorite ion is converted to hypochlorous acid below pH 7.5. $OCl(aq)+H(aq)^- \rightarrow HOCl(aq)$. Second, hypochlorous acid combines with hydrochloric acid in the solution to form chlorine gas. $HOCl(aq)+HCl(aq) \rightarrow Cl_2\ (g)+H_2O(l)$.

A mixed-oxidant solution, approximately equivalent to the mixed oxidants produced by the electrolytic cells was produced as follows. Twenty-two and one-tenth liters (22.1 l.) of 50% sodium hydroxide (NaOH) is added to 800 gal. water and allowed to mix well. The pH of the sohtion is be above pH 13.0. A chlorine gas source is slowly turned on and allowed to mix into the aqueous alkali at a low pressure input of 10 psi. As the chlorine gas input mixes with the sodium hydroxide and water solution, the pH continues to decrease until a preferred pH 9.5 to pH 10.5 is reached.

The approximate pH 9.0–10.5 is critical as this is the point where a mixture chlorite ($OCl^-$) and hydroperoxide ($OOH^-$) is very stable and stability is a key in order to ship the final product in drums to the final user application. To arrive at the desired normality for the above solution, a total of thirty-three and four tenths (33.4) lbs. of chlorine gas is utilized. Standard titration methods of eyaluating the normality of the solution are readily available. A stable hypochiorite ($OCl^-$)/hydroperoxide ($OOH^-$) solution is now ready to be utilized. The normality of the solution is between 0.02 and 0.03 as the solution is applied, although a range of normality from 0.001–0.1 is workable for different applications.

While the pH of 9.5–10.5 is critical for solutions which are to be shipped, a lower pH may be used if the solution is to be used on site, provided that it is appropriately buffered. A buffer is prepared by mixing 58.3 grams of sodium dihydrogen phosphate monohydrate ($NaH_2PO_4.H_2O$) with 69.6 grams of sodium hydrogen phosphate ($Na_2HPO_4$) in one gallon of water. When one volume of this buffer (i.e. 1 gallon) is mixed with 9 volumes of chlorite solution (i.e. 9 gallons), the pH of the resulting mixture will fall into the range of 6.8 to 7.2, depending on the strength of the oxidant solution. This buffered mixture must then be used immediately to avoid the loss of chlorine gas and oxidizing power.

In Examples D–F, procedures are described for evaluating the removal of $H_2S$ from sour natural gas.

EXAMPLE D

In-Line Injection

The present method may be employed with "in-line" injection systems to reduce the hydrogen sulfide level in sour natural gas streams. The oxidizing sweetening solution is injected at any point in-line that provides provides the opportunity to react with the gaseous hydrocarbon stream, e.g., at the well-head, at the separators, etc. In an in-line injection system, the temperature and pressure of the gas system is not critical for the success of the present method. The variation of temperatures and pressures within the system will be evident to one skilled in the art based upon the present disclosure and the particular system being used. The sweetening involves oxidation of $H_2S$ to elemental sulfur that must be filtered out of the gas stream.

EXAMPLE E

Scrubber Tower Ozidation

The instant metlind may also be used with $H_2S$ scrubber towers.

In these systesns, towers are used to increase the contact time between the sweetening solution and the gaseous hydrocarbon stream, thereby improving efficiency over the in-line system. In the scrubber tower system the sweetening solution is used in an amount providing about 0.2.5 ppm oxidant per ppm $H_2S$ in the gas stream to remove 98% of the $H_2S$ in the gas stream. The scrubber tower is the preferred apparatus in which to sweeten hydrocarbon streams according to the present method, due to its high efficiency and the relatively low capital investment required.

EXAMPLE F

Scrubber Tower Catalytic Oxidation

The instant method may also be used with $H_2S$ catalytic scrubber towers. In these systems, towers are used to increase the contact time between the sweetening solution and the gaseous hydrocarbon stream, thereby improving efficiency over the in-line system. In the scrubber tower catalytic system the sweetening solution is used as an adjunct to the catalyst, e.g., a ferric chelate (ARI 340) to improve the oxidation of the $H_2S$ in the gas stream and additionally used in the regeneration of the catalyst to the ferric state.

EXAMPLE G

Batch Laboratory Evaluation

Several experiments were conducted to evaluate the performance of liquid oxidant produced by the procedure of Example C. The oxidant solution solution has a concentration of 6% oxidant (sodium hypochlorite/sodium hydroperoxide) and pH of 10. The concentrated solution was diluted to an $O_3$ equivalent of 1200 ppm.

The test equipment comprised a two liter Omini Culture Virtis reactor equipped with a stirring system and provision for sampling the liquid reactants, and the inlet and outlet gas streams. The tests were run with a synthetic gas containing 0.5% vol $H_2S$, 5% vol $CO_2$ and 94.5% vol $N_2$ to evaluate the oxidants. This test gas has been found to give results equivalent to sour natural gas, i.e., methane containing the same amounts of $H_2S$ and $CO_2$.

The synthetic gas was bubbled through one liter solution containing oxidant at a specified concentration. The inlet and outlet concentrations of $H_2S$ in the gas stream were measured. The pH, temperature and gas flow rates were recorded. The data are summarized below in Tables IV–IX.

EXAMPLE H

Alkaline Control Run

A one cycle control was run according to Example G with NaOH solution at pH 10.65 to indicate removal of $H_2S$ from the synthetic gas by alkali in the absence of oxidant. The results are summarized in Table IV.

TABLE IV

ONE CYCLE EXPERIMENTS WITH NaOH
Temperature = 30° C. pH = 10.65
Total Iron = 0.0 ppm $O_3$ equivalent = 0.0 ppm
Gas Flow Rate = 0.00066 scf/s *

| Oxidation of $H_2S$ TIME (in min.) | $H_2S$ % | pH | % $H_2S$ REMOVAL | $H_2S$ OXID. RATE (cumulative) mg/L × min |
|---|---|---|---|---|
| 0 | 0.50 | 10.65 | 0 | |
| 5 | 0.0612 | | 87.7 | 2983.84 |
| 10 | 0.2139 | | 57.22 | 1491.92 |
| 15 | 0.3667 | | 26.6 | 302.14 |
| 20 | 0.4999 | | 0.0 | 0.013 |
| 25 | 0.4999 | 6.35 | 0.0 | 0.013 |

* Gas Composition: $N_2$ - 94.5% vol. $CO_2$ - 5.0% vol. $H_2S$ - 0.05% vol.

This example shows that aqueous alkali is a very inefficient reagent for removal of $H_2S$.

EXAMPLE I

Batch Run with Mixed Oxidant

Two tests were run according to Example G with mixed oxidant solution (NaOCl and NaOOH), produced according to Example C, at pH 9.05 to show the efficiency of removal of $H_2S$ from the synthetic gas by the mixed oxidants. One was run at 600 ppm mixed oxidants and one at 1200 ppm mixed oxidants. The results are summarized in Tables V and VI below.

TABLE V

ONE CYCLE EXPERIMENTS WITH MIXED OXIDANT[1]
Temperature = 30° C. pH = 9.05
Total Iron = 0.0 ppm $O_3$ equivalent = 600 ppm
Gas Flow Rate = 0.00066 scf/s

| Oxidation of $H_2S$ TIME (in min.) | $H_2S$ % | pH | % $H_2S$ REMOVAL | $H_2S$ OXID. RATE (cumulative) mg/L × min |
|---|---|---|---|---|
| 0 | 0.50 | 9.05 | 0 | |
| 1 | 0.01528 | | 96.94 | 16480.48 |
| 5 | 0.01528 | | 96.94 | 3296.09 |
| 7.5 | 0.01528 | | 96.94 | 2197.39 |
| 10 | 0.01528 | 9.05 | 96.94 | 1648.04 |
| 15 | 0.01528 | | 96.94 | 1098.69 |
| 20 | 0.01528 | | 96.94 | 824.02 |
| 25 | 0.01528 | | 96.94 | 659.21 |
| 27.5 | 0.01528 | | 96.94 | 599.29 |
| 30 | 0.01528 | 9.05 | 96.94 | 549.34 |
| =35 | 0.03056 | | 93.9 | 456.02 |
| 40 | 0.18336 | | 63.34 | 424.99 |
| 45 | 0.30568 | 9.05 | 38.88 | 146.81 |

*12.5 ml of 6% mixed oxidant (NaOCl and NaOOH) per liter

TABLE VI

ONE CYCLE EXPERIMENTS WITH MIXED OXIDANT[1]
Temperature = 30° C. pH = 9.05
Total Iron = 0.0 ppm $O_3$ equivalent = 1200 ppm
Gas Flow Rate = 0.00066 scf/s

| Oxidation of $H_2S$ TIME (in min.) | $H_2S$ % | pH | % $H_2S$ REMOVAL | $H_2S$ OXID. RATE (cumulative) mg/L × min |
|---|---|---|---|---|
| 0 | 0.50 | 9.05 | 0 | |
| 1 | 0.01528 | | 96.94 | 16480.48 |
| 5 | 0.01528 | | 96.94 | 3296.09 |
| 7.5 | 0.01528 | | 96.94 | 2197.39 |
| 10 | 0.01528 | 9.05 | 96.94 | 1648.04 |
| 17.5 | 0.01528 | | 96.94 | 1098.69 |
| 20 | 0.01528 | | 96.94 | 824.02 |
| 25 | 0.01528 | | 96.94 | 659.21 |
| 27.5 | 0.01528 | | 96.94 | 599.29 |
| 30 | 0.01528 | 9.05 | 96.94 | 549.34 |

*25 ml or 6% mixed oxidant (NaOCl and NaOOH) per liter

The data show a removal of about 97% of the sulfide in a batch system. A like removal is obtained in a continuous system with periodic replenishing of the oxidant.

EXAMPLE J

Batch Control Run with Iron Chelate ARI-340®

A control test was run according to Example G with ARI-340 (Iron Chelate) redox catalyst (blank) at pH 9.05 to show the efficiency of removal of $H_2S$ from the synthetic gas by Iron treating process. The results are summarized in Table VII below.

TABLE VII

ONE CYCLE EXPERIMENTS WITH ARI-340 ® IRON CHELATE
Temperature = 30° C. pH = 9.05
Total Iron = 1172.80 ppm
Gas Flow Rate = 0.00066 scf/s
Air Flow Rate = 0.0016 scf/s

Oxidation of $H_2S$

| TIME (in min.) | $Fe^{2+}$ g/l | $Fe^{3+}$ g/l | $H_2S$ % | pH | % $H_2S$ REMOVAL | $H_2S$ OXID. RATE (cumulative) mg/L × min | $Fe^{3+}$ Redu Rate mg/L × min |
|---|---|---|---|---|---|---|---|
| 0 | 0 | 1.1728 | 0.50 | 9.05 | 0 | | |
| 1 | 0.0174 | 1.1553 | 0.01528 | | 96.94 | 16480.48 | 17.4 |
| 5 | 0.0349 | 1.1327 | 0.01528 | | 96.94 | 3296.09 | 6.98 |
| 7.5 | 0.0523 | 1.1205 | 0.01528 | | 96.94 | 2197.39 | 6.98 |
| 10 | 0.0698 | 1.1029 | 0.01528 | 9.05 | 96.94 | 1648.04 | 8.37 |
| 15 | 0.1396 | 1.0331 | 0.01528 | | 96.94 | 1098.69 | 9.30 |
| 20 | 0.2094 | 0.9633 | 0.01528 | | 96.94 | 824.02 | 9.97 |
| 25 | 0.2792 | 0.8935 | 0.01528 | | 96.94 | 659.21 | 10.47 |
| 27.5 | 0.3490 | 0.8587 | 0.01528 | | 96.94 | 599.29 | 11.16 |
| 30 | 0.3490 | 0.8237 | 0.01528 | 9.05 | 96.94 | 549.34 | 11.63 |

Regeneration of Ferric ions

| Time (in min.) | $Fe^{2+}$ g/l. | $Fe^{3+}$ g/l. | $H_2S$ % | pH | $Fe^{2+}$ Oxid. Rate mg/L × min |
|---|---|---|---|---|---|
| 0 | 0.3490 | 0.8237 | | 9.05 | |
| 5 | 0.2792 | 0.8935 | | | 13.96 |
| 7.5 | 0.2443 | 0.9284 | | | 13.96 |
| 10 | 0.2094 | 0.9633 | | | 13.96 |
| 12.5 | 0.1047 | 0.9982 | | | 13.96 |
| 15 | 0.1496 | 1.0330 | | | 13.96 |
| 17.5 | 0.0698 | 1.1029 | | | 15.95 |
| 20 | 0.0 | 1.1728 | | | 17.45 |

ARI-340 1000 ml.

The data show a removal of about 97% of the sulfide in a batch system.

EXAMPLE K

Batch Control Run with Iron Chelate ARI-340® with Mixed Oxidant

A test was run according to Example G with ARI-340 (Iron Chelate) redox catalyst (blank) at pH 9.05, together with the mixed oxidant (NaOCl and NaOOH) produced according to Example C, to show the efficiency of removal of $H_2S$ from the synthetic gas by Iron treating process together with the mixed oxidant. The results are summarized in Table VIII below.

TABLE VIII

ONE CYCLE EXPERIMENTS WITH ARI-340 ® IRON CHELATE AND MIXED OXIDENT
Temperature = 30° C. pH = 9.05
Total Iron = 1172.80 ppm
Gas Flow Rate = 0.00066 scf/s
$O_3$ equivalent: 1200 ppm
Air Flow Rate = 0.0016 scf/s

Oxidation of $H_2S$

| TIME (in min.) | $Fe^{2+}$ g/l | $Fe^{3+}$ g/l | $H_2S$ % | pH | % $H_2S$ REMOVAL | $H_2S$ OXID. RATE (cumulative) mg/L × min | $Fe^{3+}$ Redu Rate mg/L × min |
|---|---|---|---|---|---|---|---|
| 0 | 0 | 1.1728 | 0.50 | 9.05 | 0 | | |
| 1 | 0.0174 | 1.1553 | 0.01528 | | 96.94 | 16480.48 | 34.90 |
| 5 | 0.0349 | 1.1327 | 0.01528 | | 96.94 | 3296.09 | 13.96 |
| 7.5 | 0.0523 | 1.1205 | 0.01528 | | 96.94 | 2197.39 | 13.96 |
| 10 | 0.0698 | 1.1029 | 0.01528 | 9.05 | 96.94 | 1648.04 | 13.96 |
| 15 | 0.1396 | 1.0331 | 0.01528 | | 96.94 | 1098.69 | 15.95 |
| 20 | 0.2094 | 0.9633 | 0.01528 | | 96.94 | 824.02 | 13.96 |
| 25 | 0.2792 | 0.8935 | 0.01528 | | 96.94 | 659.21 | 15.35 |

TABLE VIII-continued

ONE CYCLE EXPERIMENTS WITH ARI-340 ® IRON CHELATE AND MIXED OXIDENT

Temperature = 30° C. pH = 9.05
Total Iron = 1172.80 ppm
Gas Flow Rate = 0.00066 scf/s
$O_3$ equivalent: 1200 ppm
Air Flow Rate = 0.0016 scf/s

| 27.5 | 0.3490 | 0.8587 | 0.01528 |      | 96.94 | 599.29 | 15.22 |
|------|--------|--------|---------|------|-------|--------|-------|
| 30   | 0.3490 | 0.8237 | 0.01528 | 9.05 | 96.94 | 549.34 | 15.12 |

Regeneration of Ferric ions

| Time (in min.) | $Fe^{2+}$ g/l. | $Fe^{3+}$ g/l. | $H_2S$ % | pH | $Fe^{2+}$ Oxid. Rate mg/L × min |
|---|---|---|---|---|---|
| 0 | 0.4537 | 0.8028 | | 9.05 | |
| 5 | 0.3490 | 0.9075 | | | 20.94 |
| 10 | 0.2792 | 0.9773 | | | 17.45 |
| 12.5 | 0.2094 | 1.1047 | | | 16.28 |
| 15 | 0.1396 | 1.1169 | | | 20.96 |
| 17.5 | 0.0698 | 1.1867 | | | 25.52 |
| 20 | 0.0 | 1.2565 | | | 22.68 |

ARI-340 1000 ml.

The data show an increase of 50% in the $H_2S$ removal by the redox catalyst (ARI-340) and an increase of 30% in the regeneration of ferric ion in the catalyst regeneration step. The use of the mixed oxidants (NaOCl and NaOOH) makes it possible to process more gas through the same reactor or to process the same amount of gas through a much smaller reactor at a reduced capital cost.

EXAMPLE L

Batch Run with Electrolytically Produced Mixed Oxidant

When a mixed oxidant solution (NaOCl and NaOOH), produced according to Example A is substituted in a run made according to Example G at pH 9.5 the removal of $H_2S$ from the synthetic gas is about the same as was obtained in Example I. This is true at 600 ppm mixed oxidants and at 1200 ppm mixed oxidants.

EXAMPLE M

Batch Run with Electrolytically Produced Mixed Oxidant

When a mixed oxidant solution (NaOCl and NaOOH), produced according to Example B is substituted in a run made according to Example G at pH 9.5 the removal of $H_2S$ from the synthetic gas is about the same as was obtained in Example I. This is true at 600 ppm mixed oxidants and at 1200 ppm mixed oxidants.

EXAMPLE N

Continuous Run with Mixed Oxidant

When a mixed oxidant solution (NaOCl and NaOOH), produced according to Example C is substituted in a run made according to Example G at pH 9.5 the removal of $H_2S$ from the synthetic gas is about the same as was obtained in Example I. This is true at 600 ppm mixed oxidants and at 1200 ppm mixed oxidants.

EXAMPLE O

In-Line Injection of Mixed Oxidant

The present method may be employed with "in-line" injection systems to reduce the hydrogen sulfide level in sour natural gas streams. The oxidizing sweetening solution of mixed oxides (NaOCl and NaOOH) is injected at any point in-line which provides the opportunity to react with the gaseous hydrocarbon stream, e.g., at the well-head, at the separators, etc.

In an in-line injection system, the temperature and pressure of the gas system is not critical for the success of the present method. The variation of temperatures and pressures within the system will be evident to one skilled in the art based upon the present disclosure and the particular system being used. The sweetening involves a rapid oxidation of $H_2S$ to elemental sulfur which is filtered out of the gas stream.

While this invention has been described fully and completely with emphasis on certain preferred embodiments it should be understood that within the scope of the appended claims the invention may be practiced otherwise than as specifically described.

I claim:

1. A method for reducing the levels of $H_2S$ and organic sulfide contaminants present in sour natural gas comprising:
    contacting said sour natural gas with a sweetening composition comprising an aqueous solution of an approximately equimolar mixture of $OCl^-$ and $HO_2^-$, at a pH where $OCl^-$ and $HO_2^-$ are both stable, for a time sufficient to oxidize said sulfides to an odorless form.

2. A method according to claim 1 in which:
    said solution has a pH of 9.0–10.5.

3. A method according to claim 1 in which:
    said solution has an oxidant normality of 0.001–0.1 determined by titration.

4. A method according to claim 1 in which:
    said solution has an oxidant normality of 0.02–0.03 determined by titration.

5. A method according to claim 1 in which:
    said solution has a pH of 9.0–10.5 and an oxidant normality of 0.001–0.1 determined by titration.

6. A method according to claim 1 in which:
    said equimolar mixture is of NaOCl and NaOOH.

7. A method according to claim 1 in which:
    said aqueous solution is produced by mixing $Cl_2$ into a dilute aqueous solution of NaOH at about pH 10.5 until the pH reaches a level of about 9.5–10.5.

8. A method according to claim 1 in which:

said aqueous solution is produced electrochemically in a diaphragm cell having a bipolar electrode in the same compartment as the anode, collecting the effluent gas from the cell and absorbing said effluent gas into a dilute aqueous solution of NaOH at about pH 9.5–10.5.

9. A method according to claim 1 in which:

said aqueous solution is introduced into a flowing stream of natural gas at the well head or at a common collection point from a number of wells, into a flowing stream of gas in a pipe line in an amount sufficient to react and oxidize the sulfides in said natural gas, and filtering out the solids produced by the oxidation of said sulfides.

10. A method according to claim 9 in which:

said solution has a pH of 9.0–10.5.

11. A method according to claim 9 in which:

said solution has an oxidant normality of 0.001–0.1 determined by titration.

12. A method according to claim 9 in which:

said solution has an normality of 0.02–0.03 determined by titration.

13. A method according to claim 9 in which:

said solution has a pH of 9.0–10.5 and an oxidant normality of 0.001–0.1 determined by titration.

14. A method according to claim 9 in which:

said equimolar mixture is of NaOCl and NaOOH.

15. A method according to claim 9 in which:

said aqueous solution is produced by mixing $Cl_2$ into a dilute aqueous solution of NaOH at about pH 10.5 until the pH reaches a level of about 9.5–10.5.

16. A method according to claim 9 in which:

said aqueous solution is produced electrochemically in a diaphragm cell having a bipolar electrode in the same compartment as the anode, collecting the effluent gas from the cell and absorbing said effluent gas into a dilute aqueous solution of NaOH at about pH 9.5–10.5.

17. A method according to claim 9 in which:

said aqueous solution is contacted with said sour natural gas in a scrubber tower.

18. A method according to claim 17 in which:

said solution has an oxidant normality of 0.001–0.1 determined by titration.

19. A method according to claim 17 in which:

said solution has an oxidant normality of 0.02–0.03 determined by titration.

20. A method according to claim 17 in which:

said solution has a pH of 9.0–10.5 and an oxidant normality of 0.001–0.1 determined by titration.

21. A method according to claim 10 in which:

said equimolar mixture is of NaOCl and NaOOH.

22. A method according to claim 10 in which:

said solution of mixed oxidants is produced by mixing $Cl_2$ into a dilute aqueous solution of NaOH at about pH 10.5 until the pH reaches a level of about 9.5–10.5.

23. A method according to claim 10 in which:

said solution of mixed oxidants is produced electrochemically in a diaphragm cell having a bipolar electrode in the same compartment as the anode, collecting the effluent gas from the cell and absorbing said effluent gas into a dilute aqueous solution of NaOH at about pH 9.5–10.5.

24. A method for reducing the levels of $H_2S$ and organic sulfide contaminants present in sour natural gas comprising:

contacting said sour natural gas with a sweetening composition comprising a redox catalyst comprising a metal chelate having at least two oxidation states and an aqueous solution of an approximately equimolar mixture of $OCl^-$ and $HO_2^-$, at a pH where $OCl^-$ and $HO_2^-$ are both stable, for a time sufficient to oxidize said sulfides to an odorless form.

25. A method according to claim 24 in which:

said redox catalyst is a ferric chelate.

26. A method according to claim 24 in which:

said redox catalyst is reduced from a higher to a lower oxidation state while oxidizing said sulfides and when spent is oxidized to a higher oxidation state.

27. A method according to claim 26 in which:

said spent catalyst is contacted with said stable equimolar mixture of $OCl^-$ and $HO_2^-$ for a time sufficient to oxidize the catalyst to a higher oxidation state.

\* \* \* \* \*